Fig.1.

Oct. 31, 1961  M. H. EASY ET AL  3,007,154
RADAR APPARATUS
Filed July 11, 1958  3 Sheets—Sheet 3
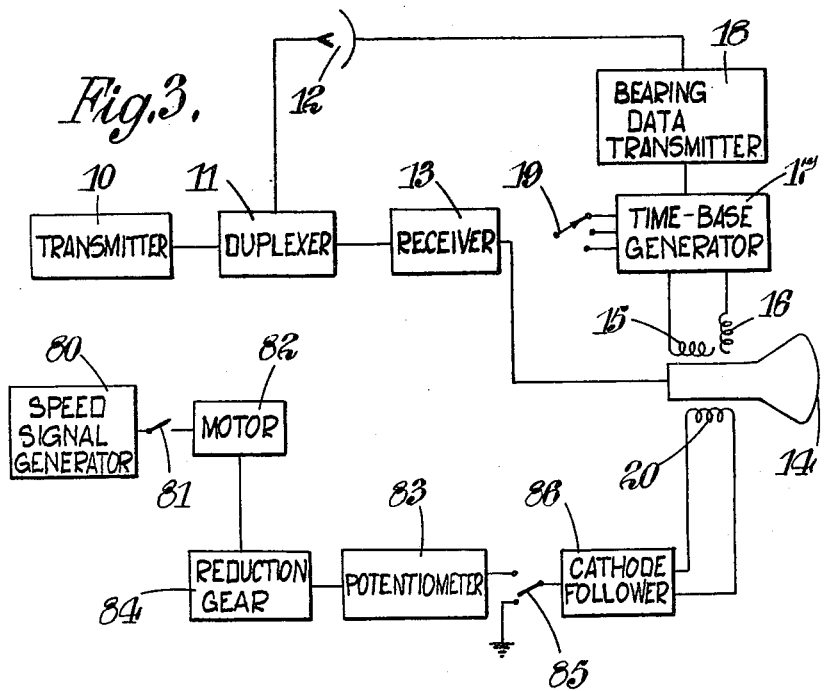
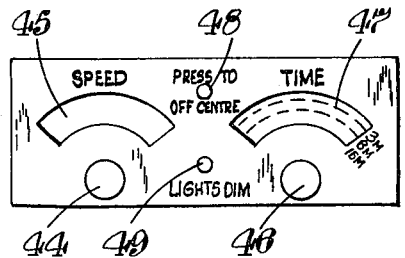

3,007,154
RADAR APPARATUS

Maurice Henry Easy, Philip David Lane Williams, and Kenneth Alexander Cook, London, England, assignors to The Decca Record Company Limited, London, England, a British company
Filed July 11, 1958, Ser. No. 747,957
9 Claims. (Cl. 343—5)

This invention relates to radar apparatus carried on a vehicle such as, for example, a ship.

Radar apparatus carried on a vehicle can measure the relative distance and relative bearings of distant targets and in its simplest form a plan position radar display displaying signals on radar apparatus carried on a vehicle gives a plan display of the relative positions of targets such as other vehicles with respect to the vehicle carrying the radar apparatus. It is often required to determine the true motion of a distant target, that is to say its true course and speed as distinct from the course and speed relative to the radar carrying vehicle. One way of doing this is by the use of what is known as a "true motion" display, that is to say a display in which all the responses are displaced on the display screen at a rate and in a direction corresponding to the movement of the radar carrying vehicle. Such a true motion display however must be azimuth stabilized if the displayed information is to be readily interpreted, that is to say any true bearing line, e.g. due north, is always in the same direction on the display screen. There are, however, sometimes certain advantages in the use of a display which is not azimuth stabilized, that is to say in which the heading of the radar carrying vehicle is always in fixed direction on the display screen since the display on the screen then corresponds directly with the relative positions of targets observed visually looking out from the vehicle. It is one of the objects of the present invention to provide improved means for determining the true motion of an observed target which can be employed whether or not the required display is azimuth stabilized.

According to this invention, in radar display apparatus carried on a vehicle and having a plan position display on a cathode tube display screen there are provided off-centering deflection means which, on application of a deflection signal, will off-centre the display on the display screen, deflection signal generating means for generating an off-centering deflection signal for off-centering the display in a direction and by an amount corresponding to the direction and distance of travel of the vehicle during a chosen period, and switch means for connecting the deflection signal generating means to said deflection means so that the switch means, when operated, apply the off-centering signal to the deflection means to off-centre the display by an amount corresponding to the movement of the vehicle during said chosen period.

This apparatus is used in the following manner: Normally the switch means remain unoperated so that no off-centering is applied to the display from the aforementioned deflection signal generating means. The display thus shows the relative positions of targets with respect to the radar carrying vehicle. When it is required to determine the true motion of a selected target, the position of that target is marked on the display screen or on a plotting surface over the display screen. The time of marking the target position is the start of said chosen period. At the end of said chosen period the aforementioned switch means are then operated so that the deflection signal generating means are connected to the deflection means to off-centre the display on the screen of a tube. The period is chosen to be such that the selected target will have moved a distance enabling its direction of travel to be determined. On operation of the switch means the position of the radar carrying vehicle is off-centered in the direction corresponding to the direction of travel of that vehicle and by an amount dependent on the distance travelled during the chosen period. The position of the selected target will also be off-centered by the same amount and its new position is marked on the display screen or on a plotting surface adjacent the display screen. The two marks put on the display screen or on the plotting surface represent the change in true position of the target during said chosen period and hence the true direction of travel and speed of the target may be determined. The switch means may be released as soon as the new position of the target has been marked so that the display then reverts to its normal condition.

It will be noted that, except when said switch means are operated, the display remains as a relative display with the radar carrying vehicle in a fixed position on the display screen. Thus the relative movement of the target may readily be determined. Information as to such relative motion is often required, as for example in considering whether the radar carrying vehicle and the target are on a collision course.

In general, the chosen period is selected to be a period during which the radar-carrying vehicle does not change course so that the required off-centering is in the direction of the heading of the vehicle. In a display which is not azimuth stabilized, that is to say, a display in which the heading of the vehicle remains in a fixed direction on the screen, provided the determination of the true motion of a target is made whilst the radar-carrying vehicle is on a constant heading, the off-centering deflection will always be in a fixed direction on the display screen and this greatly simplifies the construction of the apparatus.

In one arrangement, said off-centering signal generating means comprise a first signal generator for producing a signal proportional to the speed of the vehicle, a second signal generator for producing a signal proportional to a selectable time period and means for multiplicatively combining the outputs of the first and second generators, said switch means being effective when operated to apply the combined output signal to said off-centering deflection means. In the simplest form, said first signal generator and said second signal generator may each comprise a manually adjustable potentiometer. For combining the outputs of these potentiometers one of them may be of substantially higher impedance than the other and connected across the adjustable tapped portion of said other potentiometer. The potentiometers may have scales calibrated one in units of speed and the other in units of time; in radar display apparatus having switch means for changing the scale of the radar display one of said potentiometers may have a plurality of calibration scales corresponding to the different display scales.

In general, it has been found most convenient to use simple manually adjustable potentiometers as described above; the time scale potentiometer may readily be set to correspond to the time which has elapsed since the first mark was made on the display screen or plotting surface. It is, however, possible to arrange said second signal generating means to have control means for effecting an automatic adjustment of one signal generator in accordance with the time elapsing from the initiation of said control means. Thus, in another arrangement according to the invention, in radar display apparatus carried on a vehicle and having a plan position radar display on a cathode ray tube display screen there are provided off-centering deflection means which on application of a deflection signal will off-centre the display on the display screen, deflection signal generating means for generating an off-centering deflection signal for off-centering the display in a direction and by an amount corresponding to the direction and distance of travel of the vehicle from a datum time, a first switch for initiating operation of the deflection signal generating means at a selected datum time and a second switch for connecting the deflection signal generating means to said deflection means. With this arrangement the first switch is operated when the position of the target is marked on the display screen or plotting surface and, at any time subsequently, on operation of the second switch the display will be off-centered by the appropriate amount depending on the elapsed time and speed of the vehicle. During the interval, however, before the operation of the second switch, the display remains in its normal position and can be utilised in the normal manner. In this last described arrangement said deflection signal generating means may comprise a potentiometer for producing a deflection control signal which potentiometer is driven at a rate proportionately to the speed of the vehicle. For a ship, a log may be used which produces electrical pulses representative of units of distance travelled and such a log may be used in the manner for example described in the complete specification of co-pending application No. 629,495, now U.S. Patent No. 2,981,330, to drive the potentiometer in accordance with the distance travelled from a datum time. Alternatively, as is described in the above mentioned specification, there may be provided apparatus which may be set according to the estimated speed of the vehicle to drive the potentiometer.

In the following description, reference will be made to the accompanying drawings in which:

FIGURE 1 is a diagram illustrating a deflection control system for a pulse radar apparatus on a vehicle;

FIGURE 3 is a block diagram illustrating another form of deflectoin control system for a pulse radar apparatus on a vehicle; and FIGURE 4 is an illustration of a control panel for the deflection control system of FIGURE 1 or FIGURE 2.

Figure 1:
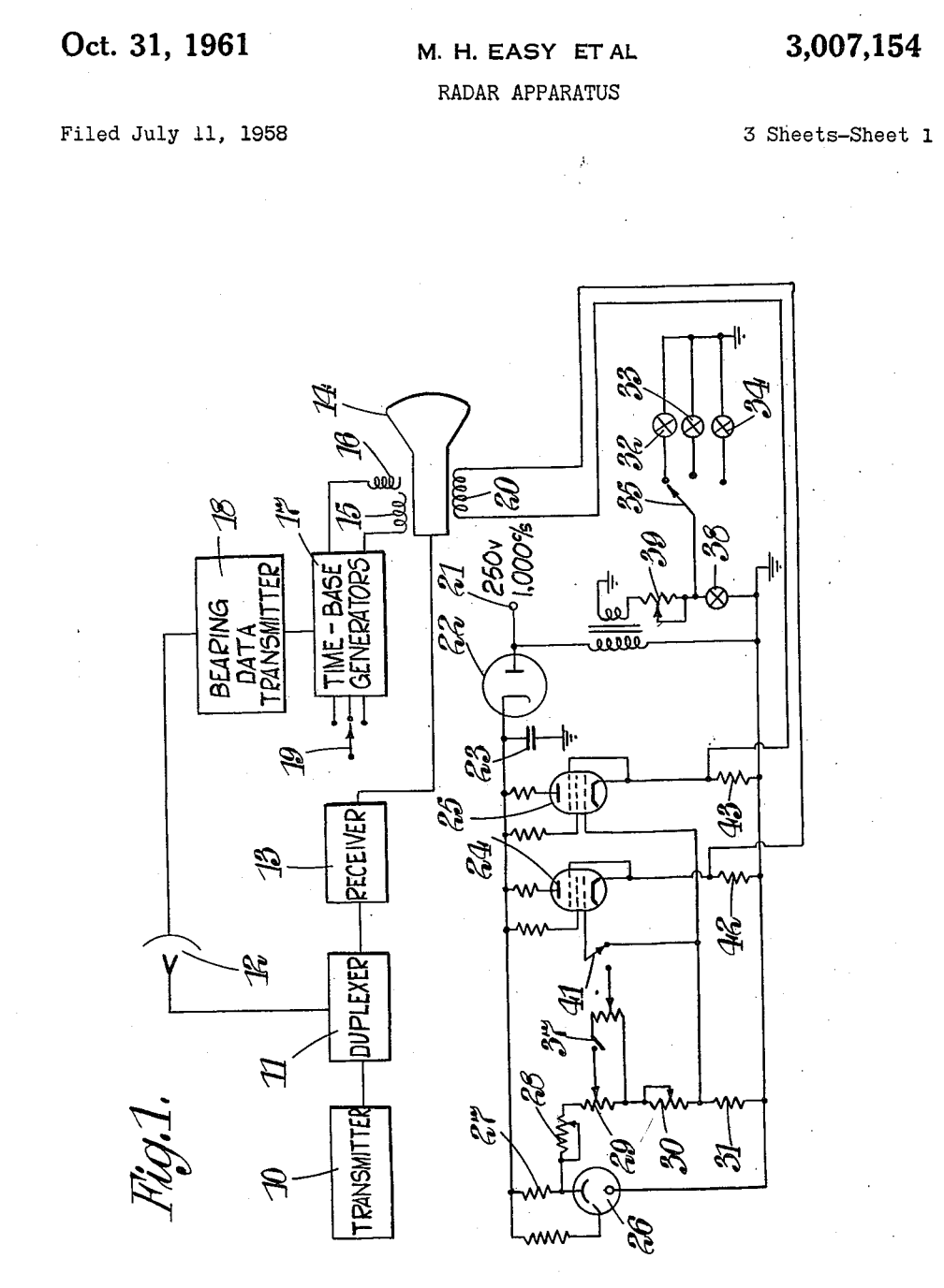
Figure 2:
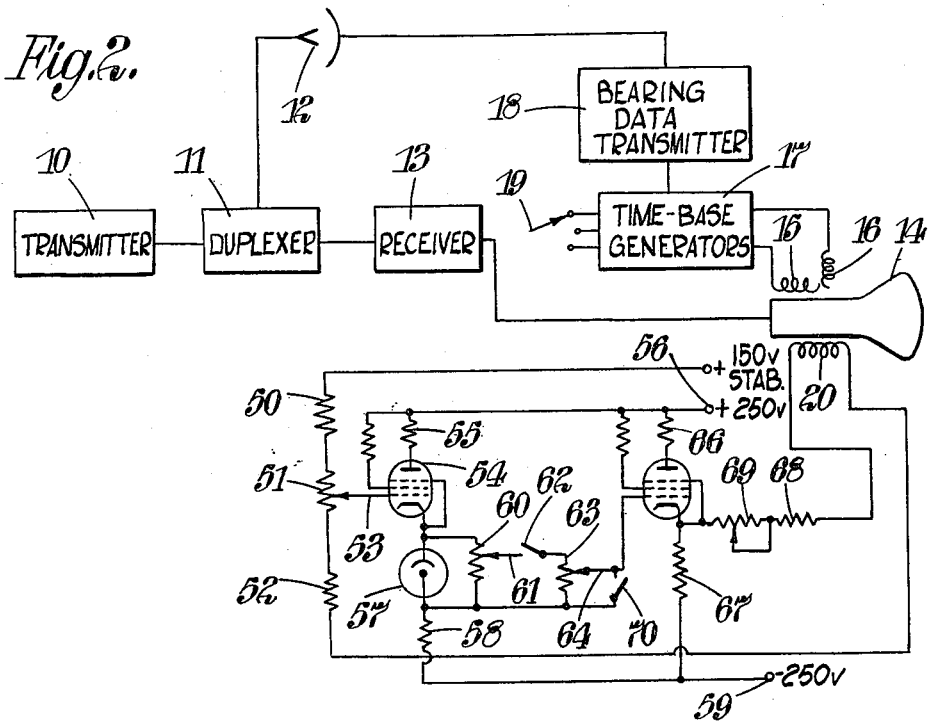
FIGURE 2 is a diagram similar to FIGURE 1 illustrating a modified form of circuit.

Referring to FIGURE 1 there is illustrated diagrammatically a pulse radar apparatus for use on a ship comprising a transmitter 10 producing short duration pulses of microwave energy which are transmitted through a duplexer 11 to a continuously rotated directional aerial system 12. Echoes of these pulses received by the aerial system 12 are fed through the duplexer 11 to a receiver 13 and thence, as video modulation signals, to a cathode ray tube 14. The beam of the cathode ray tube is scanned radially to produce a radial trace which is rotated in synchronism with the rotational scanning of the aerial system 12 and this scanning is illustrated diagrammatically as being effected by means of deflection coils 15, 16 fed by time-base generators 17 controlled by an aerial bearing transmitter 18. The scale of the display on the display screen may be varied by altering the slopes of the saw-tooth deflection signal outputs from the time-base generators 17 and a switch 19 is illustrated diagrammatically as a range-scale control. The radar system thus far described is of conventional form for producing a plan position radar display; as is well known the rotational scanning of the cathode ray beam might be effected by other means, e.g., by means of a rotating coil system. The plan position display in the simplest form is a relative display, that is to say the direction of the heading of the ship remains in a fixed direction on the display screen. The display may however be azimuth-stabilized by combining information from a compass with the aerial bearing data in the control of the rotation of the trace on the display tube.

For the purpose of the present invention there is provided an off-centering system for off-centering the display on the cathode ray tube screen and this off-centering is effected by means of a deflection coil 20. If the display is a relative display, that is to say, the heading of the vehicle remains in a constant direction on the screen then this off-centering coil 20 may be a fixed coil. If the display is an azimuth-stabilized display, the coil 20 may be rotated by means of a compass repeater so that it is effective to off-centre the display on the screen in the direction of the heading of the vehicle.

The off-centering deflection signal generating unit illustrated in FIGURE 1 makes use of an incoming alternating voltage supply which in a typical case might be a 250 voltage 1000 cycle per second supply between an input terminal 21 and earth. The incoming alternating supply is rectified by a rectifier 22 with which is associated a smoothing capacitor 23 and the direct voltage output from the rectifier 22 is used to supply high tension voltage to two valves 24, 25 and to feed a voltage stabilizing circuit comprising a stabilizer tube 26 which is connected across the direct voltage supply in series with a resistor 27. The stabilized voltage from the tube 26 is applied across a potentiometer circuit comprising an adjustable resistor 28, an adjustable potentiometer 29, another adjustable resistor 30 and a fixed resistor 31. The adjustable resistor 29 has a control shaft which carries a dial with a number of scales calibrated in units of time, these scales corresponding to the various different scales of the display in the particular radar apparatus with which this equipment is to be used. These time-base scales are illuminated respectively by different lamps, three lamps 32, 33, 34, being shown in the figure. The selection of the appropriate lamp is controlled by a multi-position switch 35, which is ganged with the range scale control switch 19 of the radar apparatus. The adjustable potentiometer 29 may in a typical case be a 10,000 ohm potentiometer. Connected in shunt across the adjustably tapped portion of potentiometer 29 is a second potentiometer 36 of higher impedance, e.g. 100,000 ohms, which is connected in series with a switch 37. The control shaft of the second potentiometer 36 carries a dial calibrated in terms of speed, which dial is illuminated by a speed dial lamp 38. The illumination of all the lamps 32, 33, 34, 38 is controlled by a dimming resistor 39. Although reference has been made to the shafts of potentiometers 29, 36, carrying dials, it will be understood that the shafts might carry pointers operating with fixed scales.

It will be seen that the voltage at the tap on the potentiometer 36 is proportional to the product of the voltage fractions determined by the settings of these two potentiometers. This voltage is applied through a switch 41 to the control grid of the aforementioned valve 24 which is arranged as a cathode follower. The output of this valve is developed across a cathode load resistance 42 and is applied to one end of the aforementioned deflection coil 20. To compensate for circuit drift occurring in the valve 24, there is provided a second valve 25 having a cathode load resistor 43 and the voltage developed across this resistor 43 is applied to the other end of the deflector coil 20 so that any circuit drifts occurring in the two valves 24, 25 will tend to cancel and not affect the current through the coil 20. This arrangement using the valve 25 also facilitates the superimposing of additional deflection signals from other sources, e.g. for normally centering the display, as these further signals may be applied to the control grid of the valve 25. The adjustable resistor 28 provides an adjustment of the maximum obtainable deflection current through the deflection coil 20 whilst the adjustable resistor 30 gives adjustment of the minimum deflection current. The resistor 31 provides a minimum positive voltage for the control grids of the valves 24, 25, the switch 41 being arranged to apply this voltage to the control grid of the valve 24 when that grid is disconnected from the output from the potentiometer 36. The switch 37 is ganged with the switch 41 so that when the switch 41 is in the position to apply the predetermined minimum voltage to the grid of the valve 24, the potentiometer 36 is disconnected from the circuit and does not affect the current through the resistor 31. The two switches 37, 41 are controlled by a spring-loaded manually-operable push-button so that the switches remain operated only for as long as the push-button is held down.

FIGURE 4 illustrates a typical control panel for the deflection control system of FIGURE 1. In FIGURE 4 a knob 44 controls the speed potentiometer 36 and its setting is indicated by a rotatable scale 45. A knob 46 controls the time potentiometer 29 and its setting is indicated by a rotatable scale member 47 carrying three scales. A push-button for controlling switches 37, 41 is shown at 48 whilst a knob 49 controls the light dimming resistor 39.

In operation the potentiometers 29 and 36 are set respectively in accordance with the required elapsed time and the speed of the ship. The elapsed time is chosen as some convenient interval in which the responses will have moved an appreciable distance on the screen of the tube. At the beginning of this time interval, the target position is plotted and the time noted; the operator then carries on in the normal way and can use the radar display since it continues in its normal condition. The potentiometers may be set at any time prior to the end of the measurement period. At the end of the chosen time interval, the push-button which controls switches 37 and 41 is depressed and the display on the screen is then off-centered by an amount corresponding to the movement of the radar-carrying vehicle during the chosen time period. The operator then marks on the screen of the tube or on the plotting surface the new position of the required target and releases the push-button. The two marks on the screen then represent the true motion of the selected target during the chosen time interval.

FIGURE 2 illustrates another off-centering deflection system for radar apparatus in which similar reference characters are used as in FIGURE 1 for similar components. In the following description reference will only be made to the distinctive features of FIGURE 2 which lie in the circuit arrangement for feeding the off-centering deflection coil 20. In the arrangement of FIGURE 2, it is assumed that suitable direct voltage supplies are available for the valves. A 150 volt stable supply is applied across a potentiometer circuit comprising a fixed resistor 50, an adjustable potentiometer 51 and a fixed resistor 52. The tap 53 on the potentiometer 51 is connected to the control grid of a pentode valve 54 which is arranged as a cathode follower, the anode circuit including a fixed parasitic suppression resistor 55 between the anode and a 250 volt supply terminal 56. The cathode of the valve 54 is connected to the anode of a gas filled voltage stabilizer tube 57, the cathode of which tube is connected through a resistor 58 to a —250 volt supply terminal 59. An adjustable potentiometer 60 is connected in shunt across the voltage stabilizer tube 57 and a tap 61 on this potentiometer is connected through a switch 62 to one end of a further adjustable potentiometer 63 which is connected across the lower-potential adjustably tapped portion of the potentiometer 60. A tap 64 on the potentiometer 63 is connected to the control grid of a further pentode valve 65 arranged as a cathode follower with a fixed parasitic suppression resistor 66 between the anode and the positive supply terminal 56 and a fixed resistor 67 between the cathode and the negative supply terminal 59. In shunt across the cathode load resistor 67 is connected the aforementioned deflection coil 20 in series with a fixed resistor 68 and an adjustable resistor 69.

The potentiometer 60 serves as the time control in a manner similar to the potentiometer 29 of FIGURE 1, whilst the potentiometer 64 serves as the speed control. The stabilizer tube 57 maintains a constant voltage across the potentiometer 60 whilst the adjustable resistor 51 enables the absolute levels of the potentials at the terminals of the voltage stabilizer tube to be adjusted to provide a centering control or zero adjustment. The potentiometer 63 is made of substantially higher impedance than the impedance of the potentiometer 60 and so the effective potential across the lower part of the potentiometer 64 represents the product of the speed and time control settings. When the switch 62 is closed, this voltage is applied to the control grid of the valve 65 and hence controls the current through the deflection coil 20. Since the cathode load resistor 67 is returned to a negative supply terminal whilst the deflection coil 20 is returned to earth, the current can be made, by this circuit, to flow in either direction through the coil 20 depending on the potential of the cathode of valve 65 and this enables the spot to be centered regardless of its natural position which it would assume in the absence of the off-centering deflection circuit. This arrangement thus provides a zero centering system which can be completed by the provision of a further deflection coil disposed at right angles to the coil 20, the current in said further coil being controlled directly by a potentiometer.

A further switch 70 is provided for short circuiting the tapped portion of the potentiometer 63 and this switch is ganged with the switch 62 so that when one is closed the other is opened. The closing of switch 70 puts a constant potential on the control grid of the valve 65 and the opening of switch 62 prevents any possibility of the stabilizer tube 57 being short circuited during this process. An adjustable resistor 69 controls the sensitivity of the deflection circuit and serves as a preset maximum deflection adjustment whilst the resistor 68 provides a fixed minimum resistance to limit the maximum current in the coil 20.

Scale illumination lamps may be provided in a manner similar to FIGURE 1 and a control panel for the operation of the circuit may be provided similar to that illustrated in FIGURE 4.

The circuit arrangement of FIGURE 2 operates in a similar manner to that of FIGURE 1: the position of the target is marked on the display tube screen or plotting surface, the potentiometer 60 is adjusted in accordance with the chosen time period, the potentiometer 63 is adjusted in accordance with the speed of the radar-carrying vessel and the switches 62, 70, which are preferably controlled by a spring loaded push-button, are operated at the end of the chosen time period to off-centre the display. The new position of the target is then marked and these markings then show the true motion of the target.

FIGURE 3 illustrates another embodiment of the invention in which similar reference numerals are used as in FIGURES 1 and 2 to indicate corresponding components. The distinction between FIGURE 3 and the arrangement of FIGURES 1 and 2 again lies in the arrangement for supplying current to the off-centering deflection coil 20. In the arrangement of FIGURE 3 there is provided a speed signal generator 80 which produces electrical pulses representative of units of distance travelled. For a ship an electrical log of known type may be used for this purpose. Alternatively the speed signal generator may be a circuit producing similar pulses which can be manually adjusted to correspond to the estimated speed of the ship. These pulses are applied through a switch 81 to a motor 82 which is arranged, for example in a manner similar to that described in the complete specification of co-pending application Ser. No. 629,495 to drive a potentiometer 83 in accordance with the distance travelled from a datum time. As described in the aforementioned specification, the motor 82 may be arranged to rotate through a predetermined amount, dependent on the selected range scale of the display, on receipt of each pulse and, by means of a reduction gear 84, drive the potentiometer 83 through the appropriate amount. The output from the potentiometer 83 is applied by a switch 85 to a cathode follower circuit 86 which feeds the aforementioned deflection coil 20. The cathode follower circuit may be similar to the circuits of either FIGURE 1 or FIGURE 2 described above.

In the arrangement of FIGURE 3, when it is required to determine the true motion of a selected target, the position of the target is marked on the display screen or on a plotting surface adjacent the display screen and the switch 81 is immediately closed. The switch 85 is left in the position shown in the drawing in which a constant voltage, illustrated diagrammatically as earth, is applied to the cathode follower circuit 86 so that the display is not off-centred and remains in its normal condition. At any subsequent time the switch 85 may be operated and the display will then be off-centred by a distance representative of the motion of the radar-carrying vehicle during the interval since the switch 81 was first closed. The switch 85 may thus be operated and the new position of the selected target marked so that the true motion of this target may be determined. The switch 85 may be released as soon as the new position of the target has been marked and preferably this switch 85 is interlocked with the switch 81 so that, on release of the switch 85, the switch 81 is also released to prepare the circuit for a fresh cycle of operation. For this purpose the switch 81 may be a latching push-button switch adapted to be released on operation of the switch 85 which may conveniently be a non-latching type of push-button switch.

It will be seen that in all three embodiments of the invention described above, the true motion of any selected target may readily be determined by the display remains in its normal condition except momentarily while the true plotting of the second position of the selected target is done. Thus there is substantially no interruption in the availability of the radar apparatus for use in the normal manner.

It will be particularly noted that the apparatus may be used both on relative displays and on azimuth stabilized displays and that the off-centering deflection circuit for enabling the true motion to be determined may readily be provided as an additional unit without affecting the construction or operation of an existing radar apparatus.

We claim:

1. In radar display apparatus carried on a vehicle and having a plan position display on a cathode ray tube display screen, the combination of off-centering deflection means, which on application of a deflection signal, will off-centre the display on the screen in a direction corresponding to the direction of movement of the vehicle, off-centering signal generating means comprising a first signal generator for producing a signal proportional to the speed of the vehicle, a second signal generator for producing a signal proportional to a selectable time period and means for multiplicatively combining the outputs of the first and second signal generators, and switch means effective when operated to apply the combined output signal to said off-centering deflection means.

2. Radar display apparatus as claimed in claim 1, wherein said plan position display is a relative display and wherein said off-centering deflection means comprises a fixed deflection coil for deflecting the cathode ray beam in a direction corresponding to the heading of the vehicle.

3. Radar display apparatus as claimed in claim 2 wherein said first signal generator comprises a manually adjustable potentiometer.

4. Radar display apparatus as claimed in claim 2 wherein said second signal generator comprises a manually adjustable potentiometer.

5. Radar display apparatus as claimed in claim 1 wherein control means are provided for automatically adjusting said second signal generating means in accordance with the time elapsing from initiation of operation of said control means.

6. In radar display apparatus for carrying on a vehicle and having a plan position display on a cathode ray tube display screen, the combination of a deflection coil arranged for deflecting the cathode ray beam on the screen in a direction corresponding to the heading of the vehicle, a first adjustable potentiometer connected across a supply source, a second adjustable potentiometer connected across the adjustably tapped portion of said first potentiometer, said second potentiometer having a substantially higher impedance than said first potentiometer, and switch means effective when operated to apply the output from said second potentiometer as a deflection signal to said fixed deflection coil.

7. The combination as claimed in claim 6 wherein each of said potentiometers has manual control means and wherein one has a scale calibrated in units of speed for setting in accordance with the speed of the vehicle and the other has a scale calibrated in units of time.

8. In radar display apparatus for carrying on a vehicle and having a plan position radar display on a cathode ray tube display screen with multi-position switch means for changing the scale of the radar display on the display screen, the combination of a deflection coil arranged for deflecting the cathode ray beam on the screen in a direction corresponding to the heading of the vehicle, a first adjustable potentiometer connected across a supply source, a second adjustable potentiometer connected across the adjustably tapped portion of said first potentiometer, said second potentiometer having a substantially higher impedance than said first potentiometer, manual control means for each potentiometer, switch means effective when operated to apply the output from said second potentiometer to said fixed deflection coil, and calibration scales for the potentiometers, one potentiometer being calibrated in units of time and the other in units of speed and one of the potentiometers having a plurality of calibration scales corresponding to the different display scales.

9. In radar display apparatus for carrying on a vehicle and having a plan position radar display on a cathode ray tube display screen, the combination of an off-centering deflection coil arranged for deflecting the cathode ray beam on the screen in a direction corresponding to the heading of the vehicle, a first signal generator for producing a signal proportional to the speed of the vehicle, a second signal generator for producing a signal proportional to a selectable time period, means for multiplicatively combining the outputs of the first and second signal generators and switch means effective when operated to apply the combined signal from said means for multiplicatively combining the outputs to said off-centering deflection coil.

References Cited in the file of this patent

UNITED STATES PATENTS

| | | |
|---|---|---|
| 2,589,584 | Thompson | Mar. 18, 1952 |
| 2,752,574 | Ragland | June 26, 1956 |
| 2,803,005 | Bartelink | Aug. 13, 1957 |